(12) United States Patent
Roche et al.

(10) Patent No.: US 12,293,566 B2
(45) Date of Patent: May 6, 2025

(54) METHOD AND SYSTEM FOR USING REMOTE DIRECT MEMORY ACCESS TO STORE METADATA FOR ENCODED DATA USING PROCESSING SYSTEM STORAGE

(71) Applicant: Dell Products L.P., Round Rock, TX (US)

(72) Inventors: Ian Roche, Glanmire (IE); Philip Hummel, San Jose, CA (US); Dharmesh M. Patel, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 420 days.

(21) Appl. No.: 17/970,306

(22) Filed: Oct. 20, 2022

(65) Prior Publication Data
US 2024/0135680 A1    Apr. 25, 2024
US 2024/0233332 A9    Jul. 11, 2024

(51) Int. Cl.
*G06V 10/766*    (2022.01)
*G06T 1/20*    (2006.01)

(52) U.S. Cl.
CPC .............. *G06V 10/766* (2022.01); *G06T 1/20* (2013.01)

(58) Field of Classification Search
CPC ................................ G06V 10/766; G06T 1/20
USPC ......................................................... 382/103
See application file for complete search history.

(56) References Cited

U.S. PATENT DOCUMENTS

| | | | |
|---|---|---|---|
| 6,311,258 B1 * | 10/2001 | Gibson ................. | G06F 9/3879 711/212 |
| 12,183,050 B1 * | 12/2024 | Khinvasara .......... | G06V 10/255 |
| 2011/0029922 A1 * | 2/2011 | Hoffberg .......... | H04N 21/44008 715/811 |
| 2022/0197773 A1 * | 6/2022 | Butler ..................... | G06F 9/505 |

* cited by examiner

*Primary Examiner* — Allen H Nguyen
(74) *Attorney, Agent, or Firm* — Chamberlain, Hrdlicka, White, Williams & Aughtry; Aly Z. Dossa

(57) ABSTRACT

A system in accordance with one or more embodiments comprises a processor, a processing system operatively connected to the processor, and an enhanced networking interface operatively connected to the processing system. The enhanced networking interface is programmed to obtain encoded data from a local data source, perform a decoding of the encoded data to obtain decoded data, provide the decoded data to the processing system. The processing system is programmed to obtain the decoded data from the enhanced networking interface, perform a computer vision (CV) inferencing on the decoded data to obtain inferencing data, provide the inferencing data to the processor, and perform, by the processor, a remediation action based on the inferencing data.

20 Claims, 12 Drawing Sheets

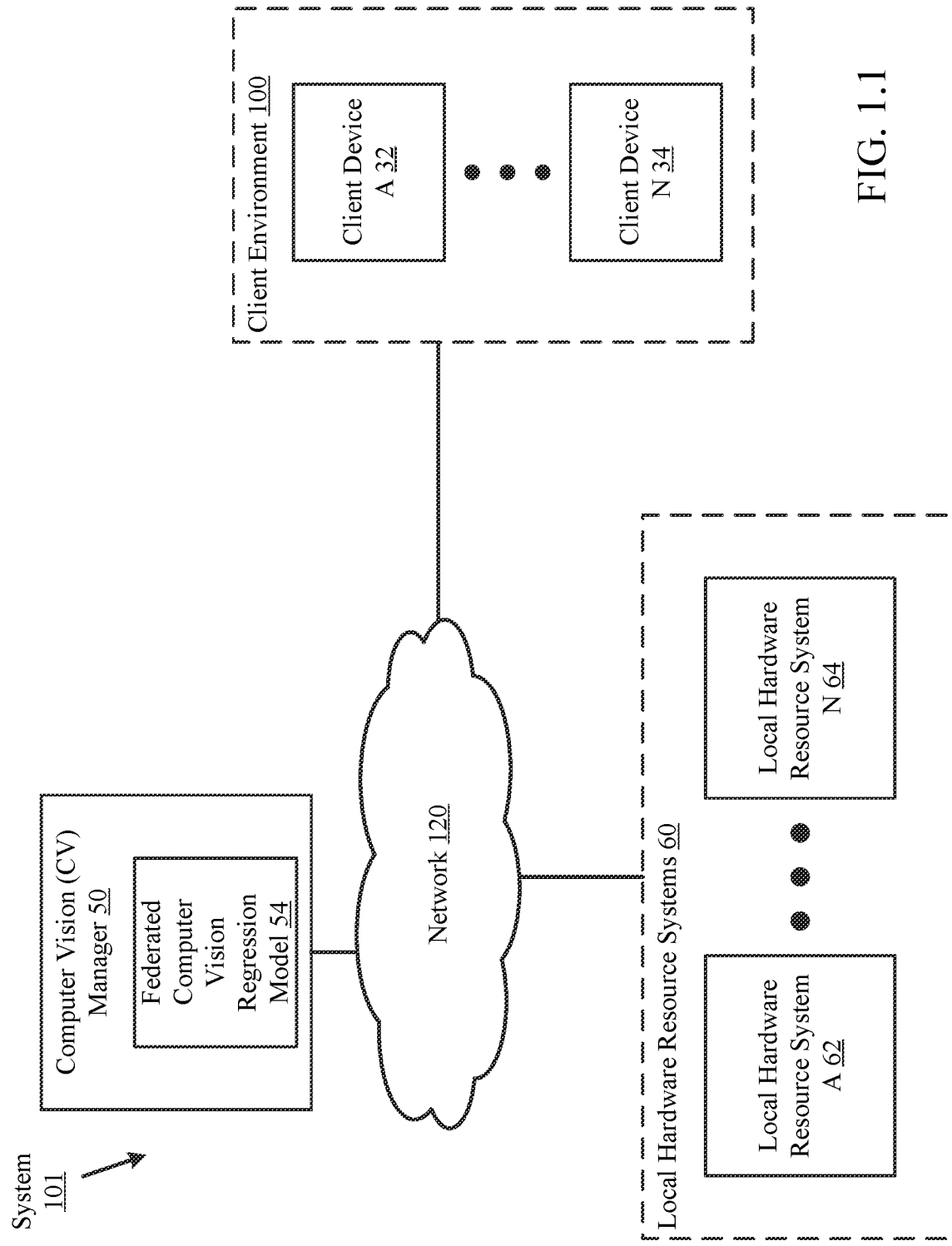
FIG. 1.1

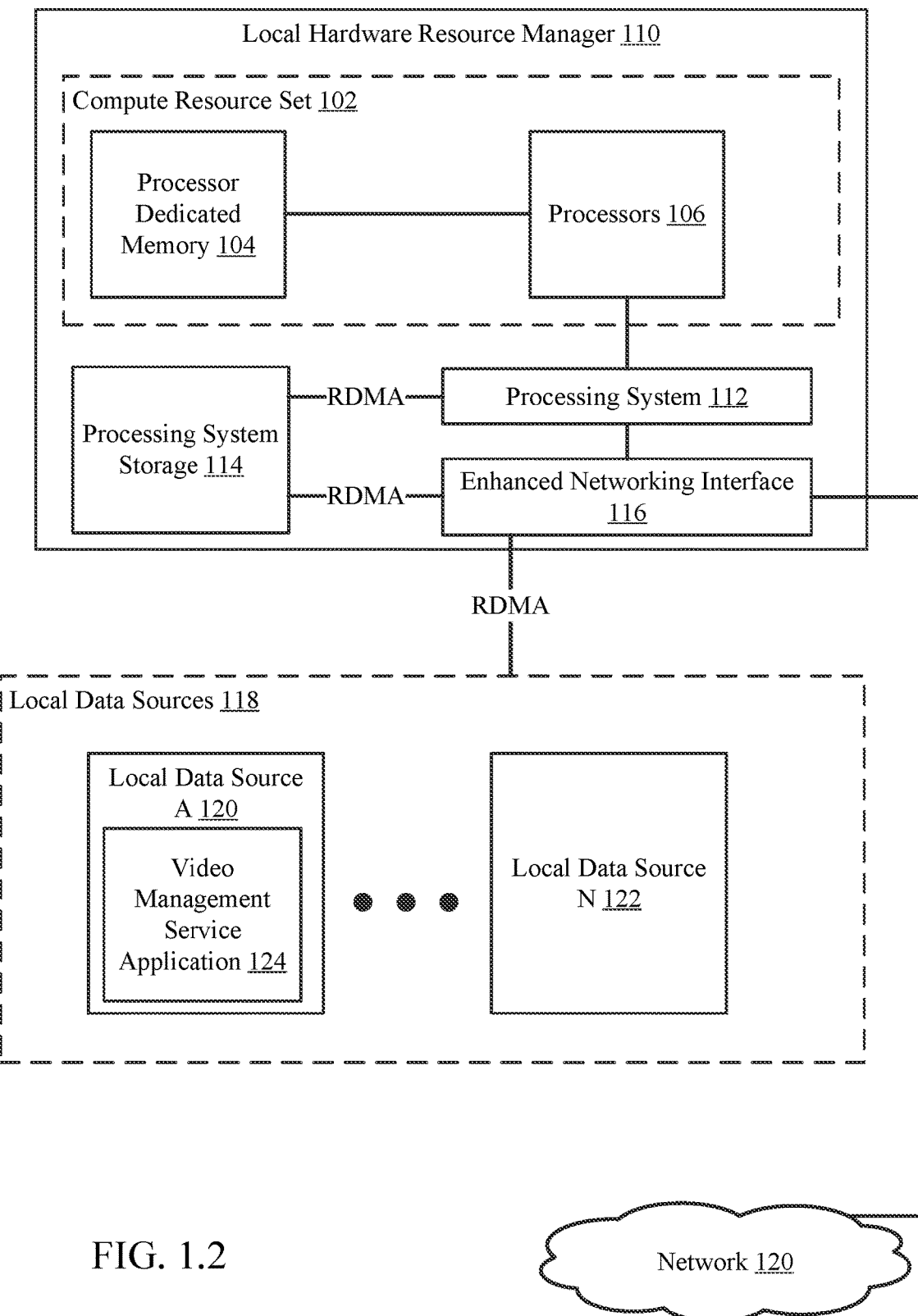
FIG. 1.2

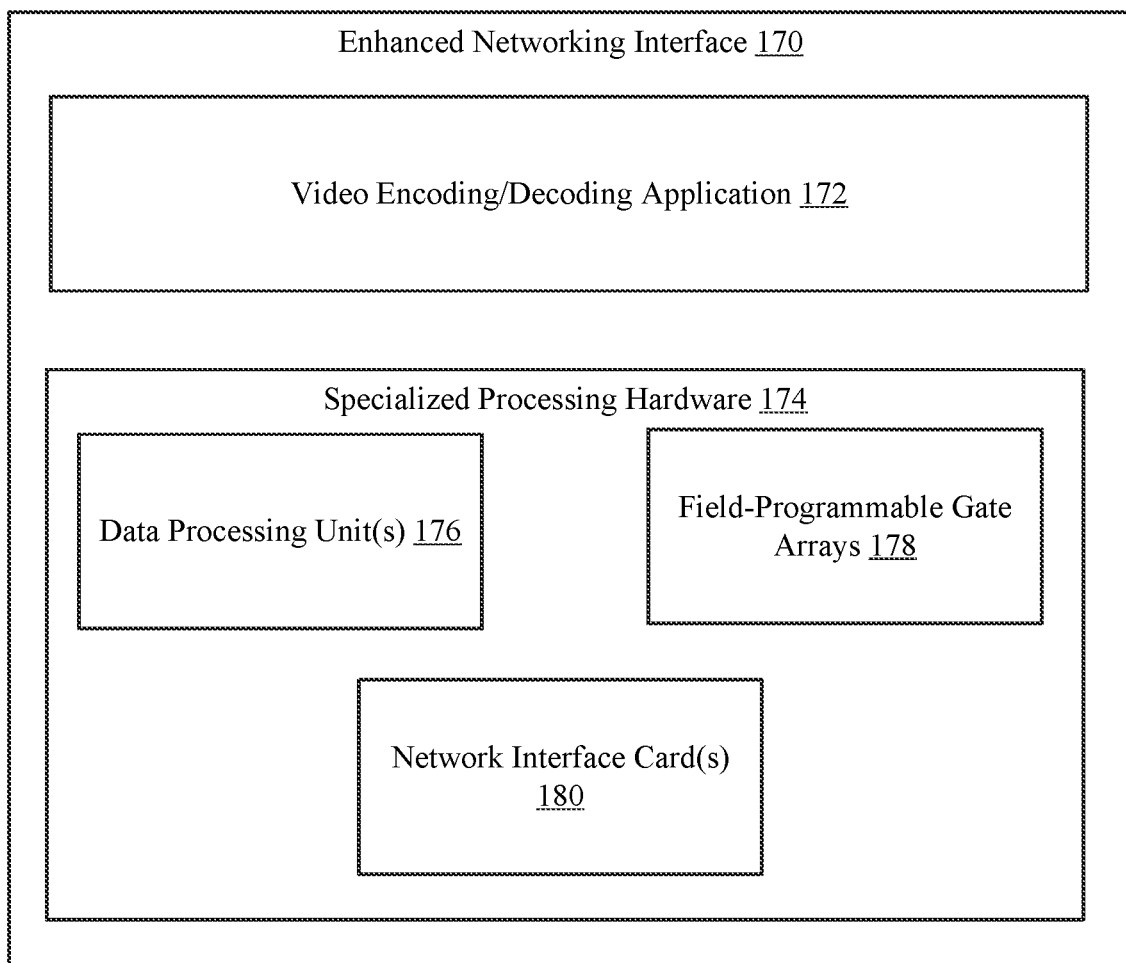
FIG. 1.3

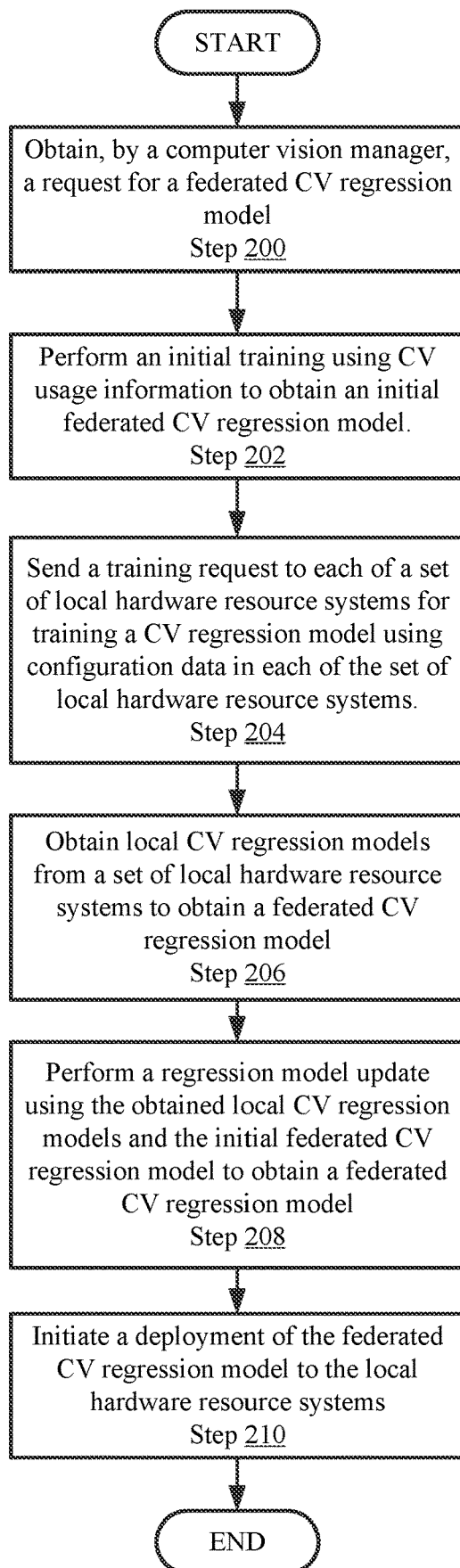
FIG. 2.1

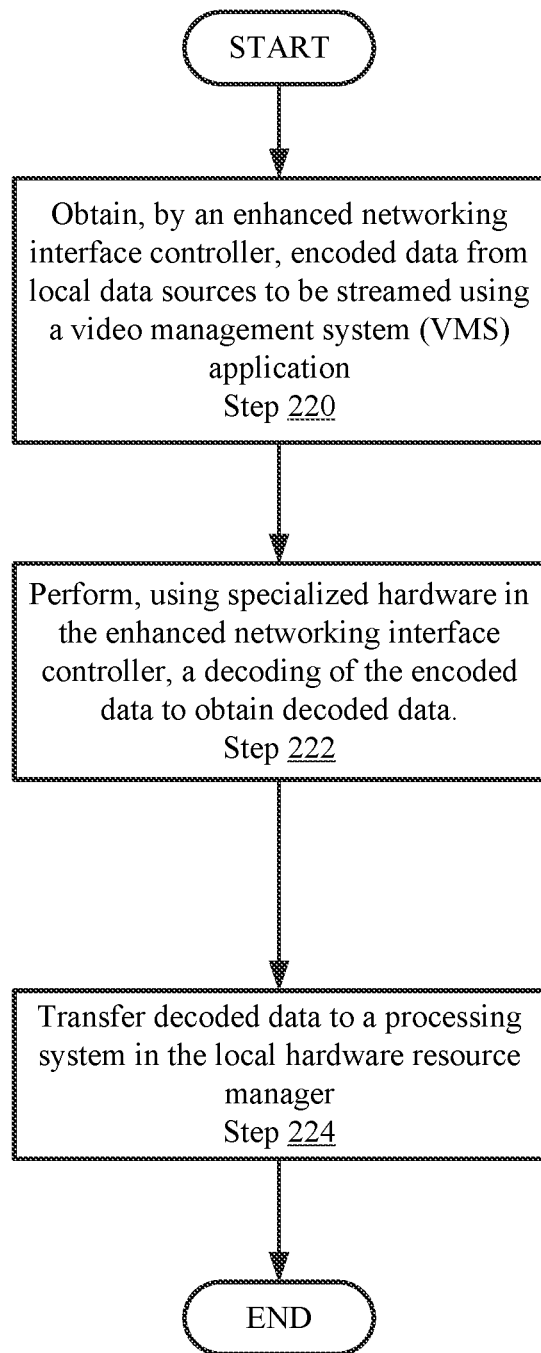
FIG. 2.2

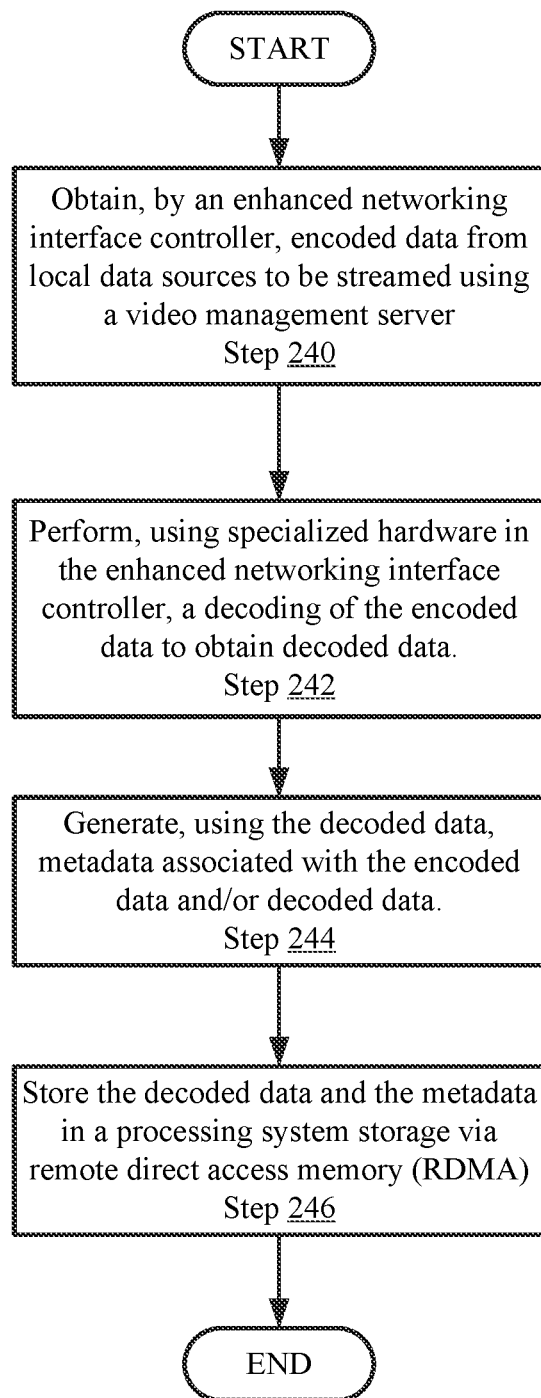
FIG. 2.3

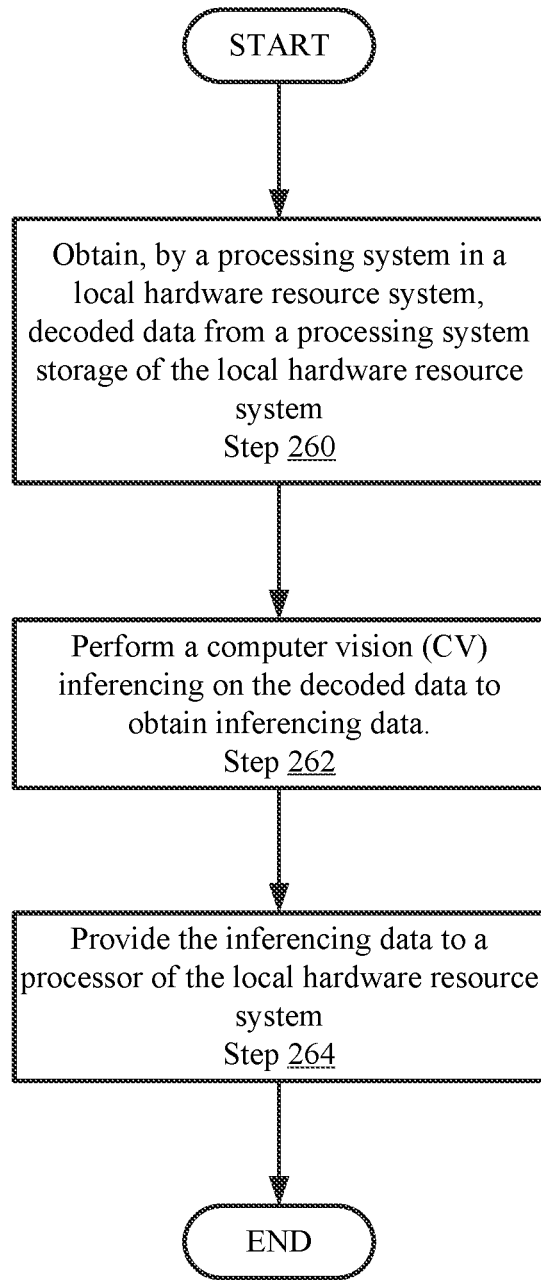
FIG. 2.4

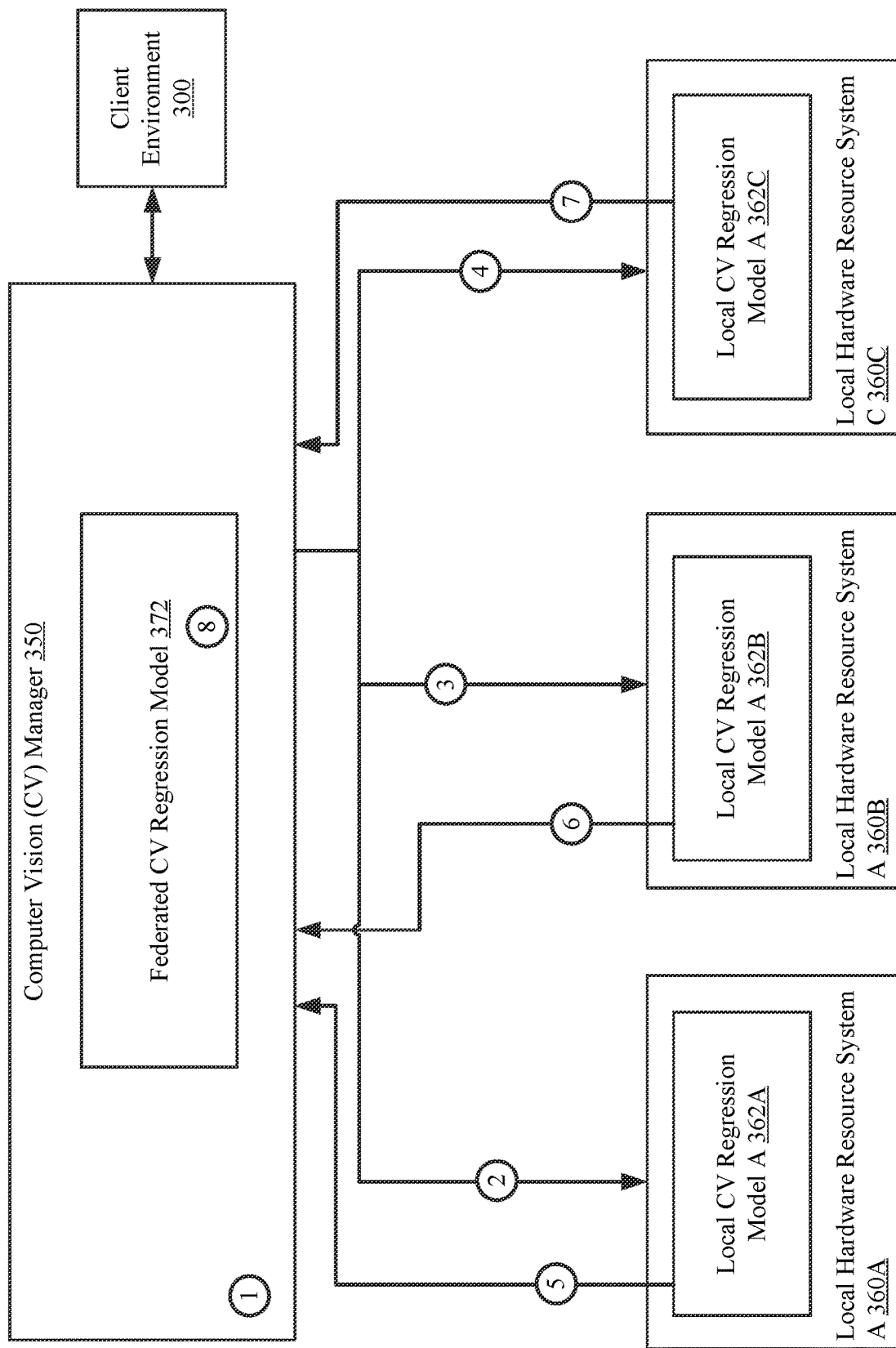
FIG. 3.1

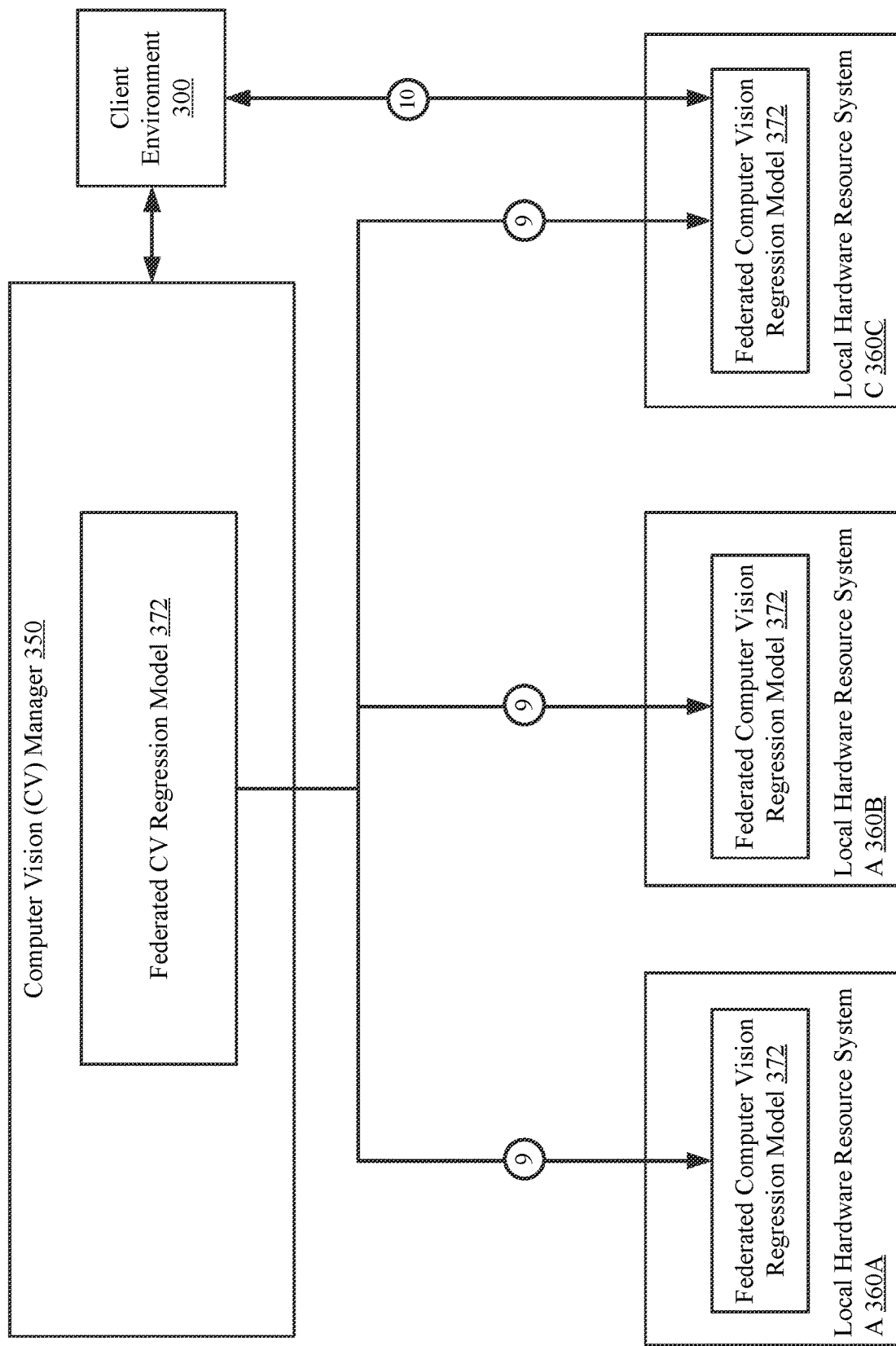
FIG. 3.2

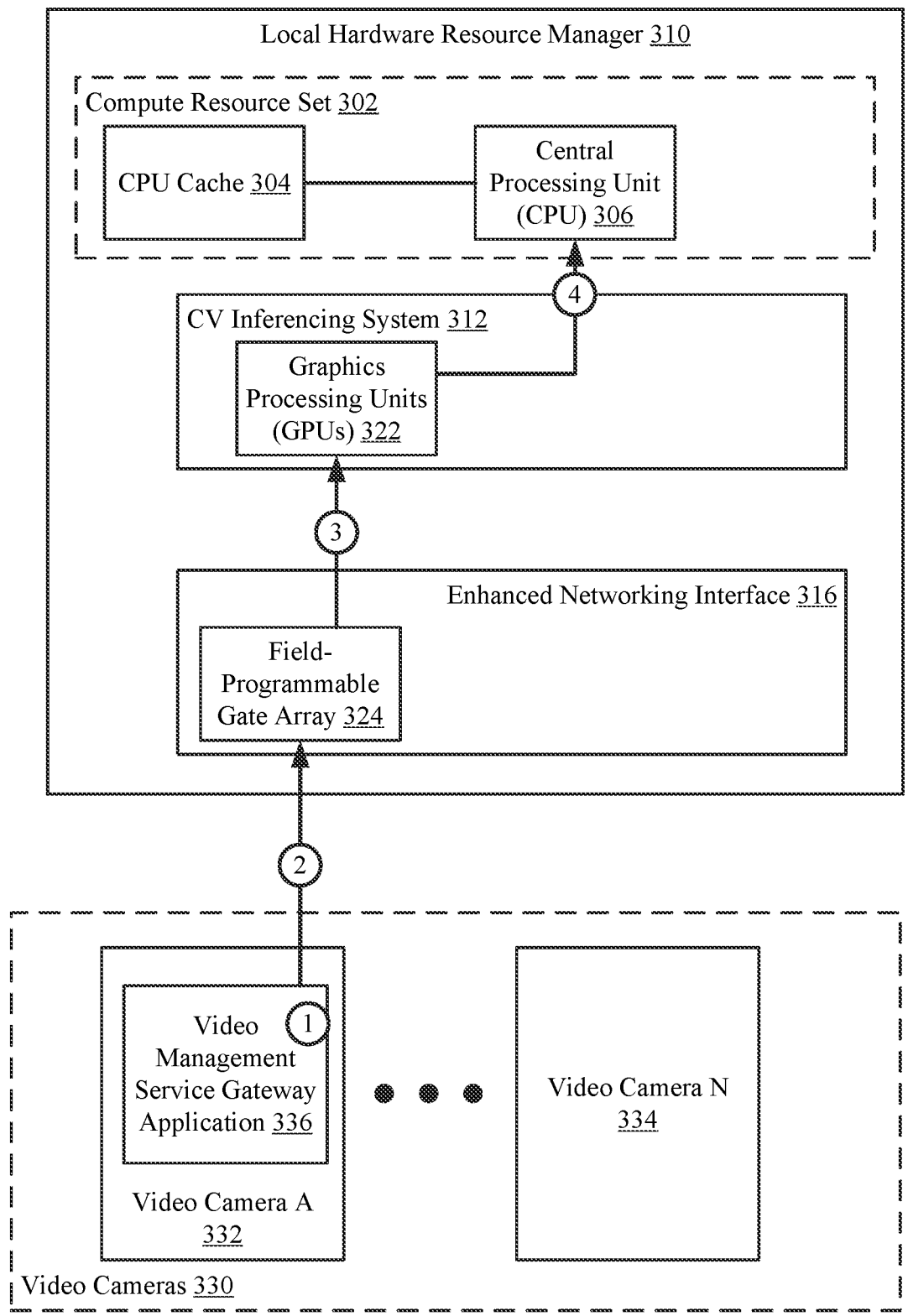
FIG. 3.3

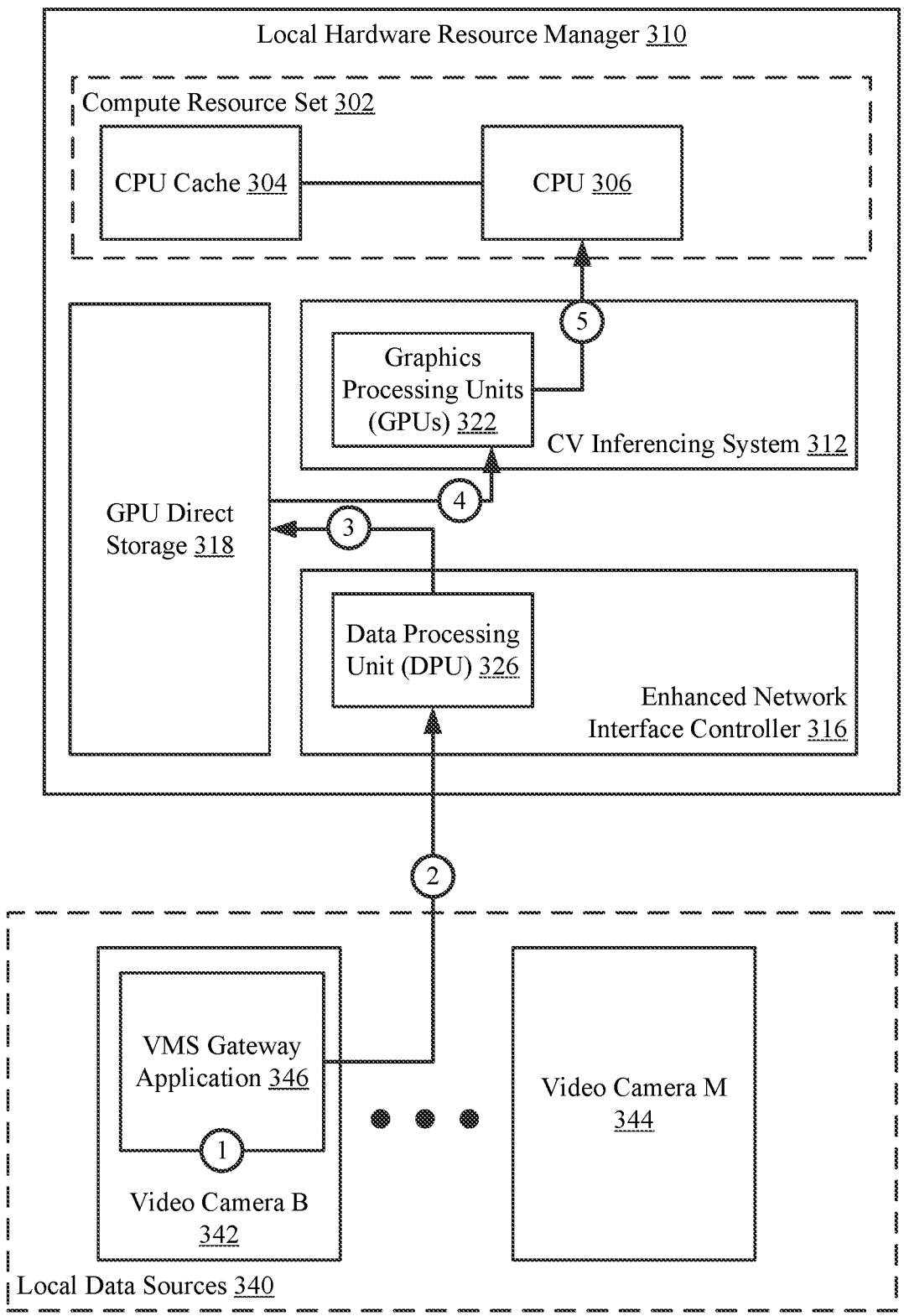
FIG. 3.4

METHOD AND SYSTEM FOR USING REMOTE DIRECT MEMORY ACCESS TO STORE METADATA FOR ENCODED DATA USING PROCESSING SYSTEM STORAGE

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a local hardware resource system in accordance with one or more embodiments of the invention.

FIG. 1.3 shows a diagram of an enhanced network interface controller in accordance with one or more embodiments of the invention.

FIG. 2.1 shows a flowchart of a method of generating a federated CV regression model in accordance with one or more embodiments of the invention.

FIG. 2.2 shows a flowchart of a method of performing a decoding of obtained video stream in accordance with one or more embodiments of the invention.

FIG. 2.3 shows a flowchart of a method of processing encoded video data in accordance with one or more embodiments of the invention.

FIG. 2.4 shows a flowchart of a method of performing CV inferencing of data in accordance with one or more embodiments of the invention.

FIGS. 3.1-3.4 show a diagram of the operation of an example system over time in accordance with one or more embodiments of the invention.

DETAILED DESCRIPTION

Figure 4:
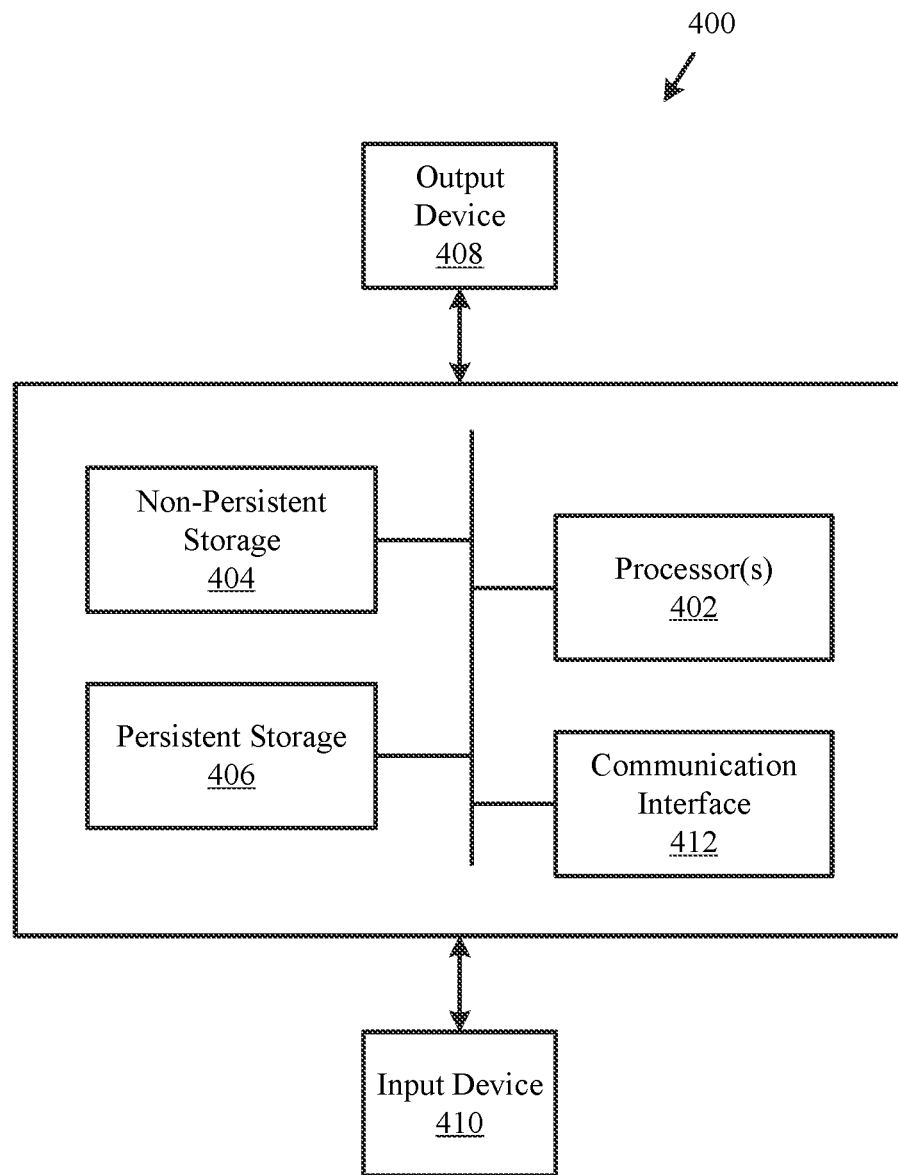
FIG. 4 shows a diagram of a computing device in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein describe methods and systems for managing computer vision (CV) systems. Embodiments disclosed herein include using a CV manager that initiates the generation of a federated CV regression model that obtains, as an input, configuration associated with a CV system. The configuration may specify, for example, the processors to be used, the model of the processors, the use case (e.g., facial recognition, object counting, etc.), and/or any other configuration. The output of the federated CV regression model may specify a number of cameras required to execute the use case in the specified configuration. Embodiments of the invention may include initiating training by one or more local hardware resource systems to generate local CV regression models. The local hardware resource systems may implement CV applications (e.g., inferencing) using local data to generate the respective local CV regression model. Each local CV regression model may be provided to the CV manager for a merging of the local CV regression models to generate the federated CV regression model. The federated CV regression model may be distributed to the local hardware resource systems for use by the clients for obtaining recommendations for configurations of a local hardware resource system.

Embodiments disclosed herein may further include enabling a processing system of a local hardware resource system to perform initial processing of encoded data obtained from local data sources. The local data sources may be video cameras that include a video management system (VMS) application that performs an encoding on data (e.g., video streams) and sends the encoded data to the processing system. The processing system may include dedicated hardware that performs the initial processing. The initial processing may include a decoding of the encoded data to obtain decoded data. The decoded data may be in a format readable to other components of the processing system. The other components may include functionality for performing CV inferencing on the decoded data to obtain inferencing data.

Embodiments disclosed herein may further include enabling an enhanced networking interface controller to perform the obtaining of the encoded data and performing the initial processing. The enhanced networking interface controller may include a data processing unit (DPU) that includes functionality for generating metadata associated with the encoded data. The encoded data and the metadata may be stored in processing system storage via remote direct memory access (RDMA). A processing system may access the processing system storage via RDMA to obtain the encoded data and the metadata. The processing system may include, for example, any number of graphics processing units (GPUs). The processing system may include functionality for performing the CV inferencing using the encoded data and the metadata.

In the context of one or more embodiments disclosed herein, the term "storage" may refer specifically to persistent storage (e.g., non-volatile storage such as, but is not limited to: disk drives, solid-state drives (SSDs), etc.), while the term "memory" refers specifically to non-persistent memory (e.g., volatile memory such as, but is not limited to: random access memory (RAM)).

The following describes various embodiments of the invention.

FIG. 1.1 shows a system in accordance with one or more embodiments of the invention. The system (101) includes a client environment (100), a network (120), one or more local hardware resource systems (60), and a CV manager (50). The system (101) may include additional, fewer, and/or different components without departing from scope of the invention. Each component may be operably connected to any of the other component via any combination of wired and/or wireless connections. Each component illustrated in FIG. 1.1 is discussed below.

In one or more embodiments of the invention, the system (101) may provide computer-implemented services (e.g., computer vision (CV) applications) to users operating in the client environment (100). To provide the computer-implemented services to the users, the system (101) may perform computations remotely to the client devices using the local hardware resource systems (60). By doing so, the users may utilize different computing devices (e.g., 400, FIG. 4) that have different quantities of computing resources (e.g., processing cycles, memory, storage, etc.) while still being afforded a consistent end-user experience. For example, by performing computations remotely to the client environment (100), the system (101) may maintain the user experience provided by the different computing devices even when the different computing devices possess different quantities of computing resources.

In one or more embodiments of the invention, to provide the aforementioned computer-implemented services, the system (101) may include any number of local hardware resource systems (60) may be utilized by the users. An administrator (not shown) may be a user with permission to make changes on the client environment (100) that will affect other users of that client environment (100). However, not all of the users and/or administrators may be allowed to receive all of the aforementioned computer-implemented services.

In one or more embodiments of the invention, the client devices (32, 34) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the client devices (32, 34) described throughout this application.

Alternatively, in one or more embodiments of the invention, the client devices (32, 34) may be implemented as logical devices. A logical device may utilize the computing resources of any number of computing devices to provide the functionality of the client devices (32, 34) described throughout this application.

In one or more embodiments of the invention, the above-mentioned system (101) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (101) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

In one or more embodiments of the invention, one or more of the local hardware resource systems (62, 64) provide CV services. For example, a local hardware resource system (62, 64) may include functionality for obtaining data (e.g., video streams, video files, photographic files, etc.) from real-world processes and processing the data based on user applications such as, for example, facial recognition, object detection, motion capture technology, and language detection. Other user applications may be applied to the data without departing from the invention.

In one or more embodiments of the invention, the local hardware resource systems (60) are each implemented as a logical device. The logical device may utilize the computing resources of any number of back-end devices to provide the functionality of the local hardware resource systems (62, 64) described throughout this application. For additional details regarding back-end devices and/or local hardware resource systems (60), see, e.g., FIG. 1.2.

In one or more embodiments, the CV manager (50) manages the generation of a federated CV regression model (54). In one or more embodiments of the invention, the federated CV regression model (54) is a data structure that takes, as an input, a predetermined configuration for a CV service and outputs a recommendation for additional configuration for the CV service. For example, the predetermined configuration for a local hardware resource system may specify a number of graphics processing units (GPUs), a frames per second (FPS) configuration for a video stream, and a bitrate configuration of the video stream. In this example, the federated CV regression model (54) may be applied to the predetermined configuration to output a recommendation for a number of cameras to be used for the CV service. Other recommendations may be output without departing from the invention. The CV manager (50) may generate the federated CV regression model (54) in accordance with FIG. 2.1.

In one or more embodiments of the invention, the CV manager (50) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the CV manager (50) described throughout this application, including, e.g., the method of FIG. 2.1.

Alternatively, in one or more embodiments of the invention, the CV manager (50) may be implemented as a logical device. The logical device may utilize the computing resources of any number of computing devices to provide the functionality of the CV manager (50) described throughout this application including, e.g., the method of FIG. 2.1.

Turning to FIG. 1.2, FIG. 1.2 shows a diagram of a local hardware resource system in accordance with one or more embodiments of the invention. The local hardware resource system (66) illustrated in FIG. 1.2 may be an embodiment of a local hardware resource system (62, 64) discussed in FIG. 1.1. Turning to FIG. 1.2, the local hardware resource system (66) includes a local hardware resource manager (110) and a set of local data sources (120). The local hardware resource system (66) may include additional, fewer, and/or different components without departing from scope of the invention. Each component may be operably connected to any of the other component via any combination of wired and/or wireless connections. Each component illustrated in FIG. 1.2 is discussed below.

To provide CV services, the local hardware resource manager (110) may include any number and type of hardware devices including, for example, one or more processors (106), any quantity and type of processor dedicated memory (104), and any number of hardware resources that include a processing system (112), a processing system storage (114), and an enhanced network interface (116).

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the processing system (112). The processors (106) of the compute resource set (102) may be operably connected to the processing system (112).

In one or more embodiments of the invention, the hardware resources of the local hardware resource manager (110) may be operably connected to external resources (e.g., other local hardware resource managers via the enhanced networking interface (116) and network (120).

In one or more embodiments of the invention, the enhanced networking interface (116) includes functionality for distributing the storage of data between the processing system (112), the processors (106), and the processing system storage (114). For example, the enhanced networking interface (116) may include functionality for implementing RDMA to access the processing system (112). The enhanced networking interface (116) may include functionality for processing obtained data in accordance with FIGS. 2.2 and 2.3. The obtained data may be initially processed and stored in the processing system storage (114).

In one or more embodiments, the enhanced networking interface (116) includes functionality for performing initial processing of data obtained from the local data sources (118). In one or more embodiments, the data may be encoded data. In other words, the data may be formatted in a way readable to other data readers. For example, the data may be a video stream. The data may be obtained by the local data sources (118) in an analog format and encoded to a digital format by a video management service (VMS) application (124). The encoded data may be transmitted to the local hardware resource manager (110) via the enhanced networking interface (116).

The enhanced networking interface (116) may be implemented using any suitable interconnection technology including, for example, system buses such as compute express links or other interconnection protocols. The enhanced networking interface (116) may support any input/output (I/O) protocol, any memory protocol, any coherence interface, etc. The hardware resources interface (116) may support processor to device connections, processor to memory connections, and/or other types of connections. The enhanced networking interface (116) may be implemented using one or more hardware devices including circuitry adapted to provide the functionality of the hardware resources interface (116).

For additional details regarding the enhanced networking interface, refer to FIG. 1.3.

In one or more embodiments, the processing system (112) includes functionality for performing CV inferencing based on user configuration. For example, a user utilizing the services of the local hardware resource system (66) may configure the hardware to perform CV inferencing. The processing system (112) may perform the CV inferencing in accordance with the configuration. The CV inferencing may include, for example, processing of obtained data generated by the local data sources (118). Examples of CV inferencing include, but are not limited to: performing facial recognition applications, performing object detection, performing language detection, enabling autonomous vehicles to perform self-driving, and generation of three-dimensional objects.

In one or more embodiments, the processing system (112) is implemented using a set of one or more graphics processing units (GPUs). The GPUs may be configured in accordance with a user configuration. The user configuration may be determined using the method of FIG. 2.1. The GPUs may be partitioned (or logically divided) in accordance with any configuration to perform the functionality of the processing system (112) discussed throughout this application. The processing system (112) may not be used to operate an operating system operating on the compute resource set (102).

In such embodiments in which the processing system (112) is implemented using GPUs, the processing system storage (114) may be implemented as GPU direct storage. The GPU storage may be accessed by the enhanced networking interface (116) via RDMA channels that enable direct connection to the GPU direct storage without requiring the use of the compute resource set (102).

In some embodiments of the invention, the compute resource set (102) and/or processing system (112) may be implemented as separate physical devices. In such a scenario, the enhanced networking interface (116) may include one or more networks enabling these resource sets to communicate with one another. Consequently, any of these resource sets (e.g., 102, 112) may include network interface controllers or other devices to enable the hardware devices of the respective resource sets to communicate with each other.

In one or more embodiments, the local data sources (118) include functionality for generating data obtained from real-world processes. A data source may be, for example, a video camera. The video camera may record a real-world process and perform any processing on the recording to generate the data. The data may be streamed to the local hardware resource manager (110) via, e.g., the enhanced networking interface (116). For example, the video camera may generate video data as camera raw information. A VMS application (124) executing in the local data source (120, 122) may include functionality for encoding the camera raw information by, e.g., compressing the data to generate encoded data. The encoded data may be transmitted to the enhanced networking interface (116). The enhanced networking interface may process the encoded data in accordance with FIGS. 2.2 and 2.3.

The network (120) may correspond to any type of network and may be operably connected to the Internet or other networks thereby enabling the information handling system (100) to communicate with any number and type of other devices (e.g., other information handling systems).

The local hardware resource manager (110) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the local hardware resource manager (110) described in this application. The local hardware resource manager (110) may be implemented using other types of computing devices without departing from the invention. For additional details regarding computing devices, refer to FIG. 4.

FIG. 1.3 shows a diagram of an enhanced networking interface. The enhanced networking interface (170) may be an embodiment of the enhanced networking interface (116, FIG. 1.2) discussed above. As discussed above, the enhanced networking interface (170) includes functionality for performing initial processing of obtained data (e.g., encoded data). As illustrated in FIG. 1.3, the enhanced networking interface (170) includes a video encoding/decoding application (172) and specialized processing hardware (174). The enhanced networking interface (170) may include additional, fewer, and/or different components without departing from scope of the invention. Each component may be operably connected to any of the other components via any combination of wired and/or wireless connections. Each component illustrated in FIG. 1.3 is discussed below.

In one or more embodiments, the video encoding/decoding application (172) includes functionality for decoding encoded data. The encoded data may be data obtained from local data sources (e.g., video cameras with a VMS application, refer to FIG. 1.2). The decoding may include, for example, decompressing compressed video data. The video encoding/decoding application (172) may further include functionality for re-encoding encoded data. In other words, the video encoding/decoding application (172) may convert the encoded data to a second format from the format of the encoded data. The second format may be a format readable to a processing system (e.g., 112, FIG. 1.2). In one or more embodiments, the decoded data and/or the re-encoded data may be stored in a processing system storage.

In order to perform the functionality of the video encoding/decoding application (172) described above, the enhanced networking interface (170) may include specialized processing hardware (174). The specialized processing hardware (174) may include, for example, data processing units (DPUs), field-programmable gate arrays (178), and one or more network interface cards (180).

In one or more embodiments of the invention, the DPUs (174) may be programmable hardware with dedicated processors (e.g., CPUs) that may be programmed to perform the functionality of the video encoding/decoding application (172) and/or the enhanced networking interface (170) described throughout this application. The DPUs may further include dedicated networking interfaces that interact with other components in a system (e.g., with the processing system storage, the local data sources, the processing system, etc. discussed above.

In one or more embodiments of the invention, the networking interface cards (180) may be hardware designed to provide connectivity between the enhanced networking interface (170) and other components in a system. The networking interface cards (180) may be equipped with RDMA to access, for example: (i) the encoded data from the local data sources, (ii) the processing system for storage of re-encoded and/or decoded data, (iii) the processing system for direct transmission of the re-encoded and/or decoded data, and (iii) other components in a system. The networking interface cards (180) may, collectively, include multiple physical ports that provide the aforementioned connectivity.

FIG. 2.1 shows a flowchart of a method of generating a federated CV regression model in accordance with one or more embodiments of the invention. The method shown in FIG. 2.1 may be performed by, for example, a CV manager (e.g., 50, FIG. 1.1). Other components of the system in FIG. 1.1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

Turning to FIG. 2.1, in step 200, a request for a federated CV regression model is obtained. In one or more embodiments of the invention, the request specifies generating a federated CV regression model. As discussed above, the CV regression model is a data structure that is used by inputting predetermined configurations and outputting a recommendations for additional configuration of the local hardware resource system. In one or more embodiments, the request may be initiated by an administrator of a client system. The administrator may request to utilize the federated CV regression model to determine how to configure the local hardware resource system to perform a CV inferencing for video stream data.

In step 202, an initial training is performed using CV usage information to obtain an initial federated CV regression model. In one or more embodiments of the invention, the initial training includes applying a machine learning model on historical data available to the CV manager to generate the initial CV regression model. The initial federated CV regression model may be, for example, a linear regression machine learning model. In one or more embodiments, the historical data may include video data and a configuration of a system that generated and processed (e.g., by CV inferencing) video data.

For example, the historical data may be obtained via public means. In contrast, other data generated by local hardware resource systems may be private and unavailable to the CV manager. To overcome the lack of availability, it would be beneficial to prompt the local hardware resource systems to generate local CV regression model using their video data, inferencing data, and/or configuration data.

Turning to step 204, a training request is sent to each of a set of local hardware resource systems for training a CV regression model using configuration data in each of the set of local hardware resource systems. The training request specifies applying the aforementioned machine learning algorithm to generate the local CV regression model.

Each local hardware resource system may service the training request by implanting a configuration, generating inferencing data in accordance with, e.g., FIG. 2.4, and generate the local CV regression model. In one or more embodiments of the invention, the local CV regression model comprises a set of machine learning model weights. The machine learning model weights may be numerical values that represent the parameters of the machine learning model. The generated local CV regression models may be provided to the CV manager.

In step 206, local CV regression models are obtained from the local hardware resource systems.

In step 208, a regression model update is performed using the obtained local CV regression models and the initial federated CV regression models to obtain a federated CV regression model. In one or more embodiments, the federated CV regression model is generated by assigning the obtained machine learning model weights, obtaining, e.g., an average of the machine learning model weights and weights of the initial federated CV regression model to obtain the federated CV regression model.

In step 210, a deployment of the federated CV regression model is initiated to the local hardware resource systems. In one or more embodiments of the invention, the federated CV regression model is distributed to each local hardware resource system in the system.

In one or more embodiments, the administrator of the client environment may send a request for a recommendation for additional configuration for a local hardware resource system. For example, the recommendation may be for a number of cameras to be assigned to a CV inferencing. The local hardware resource system may apply the federated CV regression model to a predetermined configuration, provided by the administrator. The output of the federated CV regression model is a recommendation for a number of cameras to be assigned based on the predetermined configuration.

FIG. 2.2 shows a flowchart of a method of performing a decoding of obtained video stream in accordance with one or more embodiments of the invention. The method shown in FIG. 2.2 may be performed by, for example, an enhanced networking interface (e.g., 116, FIG. 1.1). Other components of the system in FIG. 1.1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

In step 220, encoded data is obtained from local data sources to be streamed using a VMS application. In one or more embodiments of the invention, the encoded data is video stream data that is encoded in a first format by the VMS application. For example, the video stream data is encoded by performing a compression. In this example, the streaming of the encoded data includes transmitting less data, which may improve the bandwidth between the local data source transmitting the encoded data and the enhanced networking interface obtaining the encoded data. As a second example, the video stream data is transmitted by converting the video stream data from a first format to a second format.

In one or more embodiments of the invention, the encoded data is obtained from a local data source. The local data source operating in the VMS may be operatively connected to the enhanced networking interface via RDMA. Specifically, the VMS application in the local data source may be RDMA-capable and include functionality for transmitting the encoded data via a RDMA channel to the enhanced networking interface.

In step 222, a decoding of the encoded data is performed using specialized hardware to obtain decoded data. In one or more embodiments, the decoding includes decompressing the video stream data and/or re-converting the video stream data to a format readable to the processing system for a CV inferencing.

In one or more embodiments of the invention, the specialized hardware performing the decoding may be a DPU, a FPGA, and/or any other programmable hardware without departing from the invention.

In step 224, the decoded data is transferred to a processing system. In one or more embodiments, the decoded data is transferred via RDMA-capable methods to the processing system. This may reduce the requirement to perform, for example, any transmission protocols (e.g., transmission control protocol (TCP), internet protocol (IP)) between components with central processing units (CPUs).

FIG. 2.3 shows a flowchart of a method of processing encoded video data in accordance with one or more embodiments of the invention. The method shown in FIG. 2.3 may be performed by, for example, an enhanced networking interface (e.g., 116, FIG. 1.1). Other components of the system in FIG. 1.1 may perform all, or a portion, of the method of FIG. 2.3 without departing from the invention.

While FIG. 2.3 is illustrated as a series of steps, any of the steps may be omitted, performed in a different order, additional steps may be included, and/or any or all of the steps may be performed in a parallel and/or partially overlapping manner without departing from the invention.

Turning to FIG. 2.3, in step 240, encoded data is obtained from local data sources to be streamed using a VMS application. The VMS application may operate in a local data source. In one or more embodiments of the invention, the encoded data is obtained similar to step 220.

In step 242, a decoding of the encoded data is performed using specialized hardware to obtain decoded data. In one or more embodiments, the decoding includes decompressing the video stream data and/or re-converting the video stream data to a format readable to the processing system for a CV inferencing.

In one or more embodiments of the invention, the specialized hardware performing the decoding may be a DPU, a FPGA, and/or any other programmable hardware without departing from the invention.

In step 244, metadata associated with the encoded data is generated. In one or more embodiments of the invention, the metadata is generated by determining timestamps associated with the encoded data. Alternatively, the metadata is generated based on the local data sources. For example, the enhanced networking interface may be aware of the geographical location (e.g., global positioning system (GPS) coordinates) of the local data source. In this example, the enhanced networking interface may generate additional metadata associated with the GPS coordinates that may not have been obtained from the local data sources.

In step 246, the decoded data and the metadata is stored in a processing system storage via remote direct access memory (RDMA). In one or more embodiments, the decoded and/or re-encoded data is transmitted to the processing system storage using a RDMA channel. The processing system storage may be accessed by the processing system via a second RDMA channel. The processing system may perform the processing in accordance with, e.g., FIG. 2.4.

FIG. 2.4 shows a flowchart of a method of performing CV inferencing of data in accordance with one or more embodiments of the invention. The method shown in FIG. 2.4 may be performed by, for example, a processing system (e.g., 112, FIG. 1.1). Other components of the system in FIG. 1.1 may perform all, or a portion, of the method of FIG. 2.4 without departing from the invention.

While FIG. 2.4 is illustrated as a series of steps, any of the steps may be omitted, performed in a different order, additional steps may be included, and/or any or all of the steps may be performed in a parallel and/or partially overlapping manner without departing from the invention.

In step 260, decoded data is obtained from a processing system storage of the local hardware resource system. In one or more embodiments of the invention, the decoded data may be obtained using the second RDMA channel discussed above. Further, the generated metadata may be obtained from the processing system storage.

In step 262, a CV inferencing is performed on the decoded data to obtain inferencing data. In one or more embodiments, performing the CV inferencing includes processing the encoded/decoded data in accordance with a user configuration. Examples of CV inferencing may include, for example, facial recognition processing, object detection, three-dimensional image generation, and road condition monitoring. Other examples of CV inferencing may be performed without departing from the invention. The results of the CV inferencing may include the inferencing data.

In step 264, the inferencing data is provided to a processor of the local hardware resource system. In one or more embodiments of the invention, the inferencing data is provided to the processor (e.g., the operating system of the local hardware resource manager). The processor may, as a result, provide the inferencing data to the user (e.g., using the client environment).

In one or more embodiments, the processor, as a result, may perform a remediation action based on the obtained inferencing data. In one or more embodiments, the remediation action may include, for example, modifying the number of local data sources assigned to the CV inferencing, modifying a configuration of the processing system (e.g., increasing the number of GPUs assigned to perform the CV inferencing), and notifying the user of the results of the CV inferencing.

To further clarify embodiments of the invention, three non-limiting examples are provided in FIGS. 3.1-3.4. For the sake of brevity, only a limited number of components of the system of FIGS. 1.1-3.2 are illustrated in FIGS. 3.1-3.4. FIGS. 3.1-3.4 may illustrate processes labeled using circled numbers and described using brackets in numbers (e.g., "[1]").

Example 1

Consider a scenario in which an administrator of a client environment would like to utilize the services of a local hardware resource system for performing facial recognition of people entering and leaving a building secured using security camera. The accuracy of the facial recognition processing may depend on the number of cameras that transmit video streams to a processing system implementing the facial recognition processing. Further, the number of cameras may impact the efficiency of the computing resource use of the processing system. In other words, the more cameras assigned to the facial recognition processing, the more accurate the results of such processing, but this may also increase the computational burden applied to the computing resources. As such, the administrator would like to determine how many cameras would be most efficient for performing the aforementioned processing.

Turning to FIG. 3.1, FIG. 3.1 shows a diagram of an example system. The example system includes a CV manager (350) that is instructed, by the administrator (not shown), to generate a federated CV regression model [1]. The CV manager (350), in response to the instruction, sends a training request to each of three local hardware resource systems (360A, 360B, 360C). A first training request is sent to local hardware resource system A (360A) [2]. A second training request is sent to local hardware resource system B (360B) [3]. A third training request is sent to local hardware resource system C (360C) [4].

The training requests specify generating a local CV regression model based on a configuration of the corresponding local hardware resource systems (360A, 360B, 360C). The local CV regression models (362A, 362B, 362C) include a set of regression model parameters generated based on a machine learning model applied to the performance metrics and the configurations of the respective local hardware resource system (360A, 360B, 360C).

In response to receiving the training requests, each of the local hardware resource systems (360A, 360B, 360C) implements a CV inferencing using their respective computing resources, including their GPUs, FPGAs, storage, memory, and number cameras. The local hardware resource systems (360A, 360B, 360C) each track the performance of the CV inferencing for a given configuration and use the generated video streams to perform the CV inferencing. Based on the performance of the local hardware resource systems (360A, 360B, 360C), the local hardware resource systems (360A, 360B, 360C) generate weights for the respective local CV regression models (362A, 362B, 362C).

Based on the training, local hardware resource A (360A) generates local CV regression model A (362A), local hardware resource system B (360B) generates local CV regression model B (362B), and local hardware resource system C (360C) generates local CV regression model C (362C). The respective local CV regression models (362A, 362B, 362C) are sent to the CV manager (350) [5, 6, 7].

After obtaining the local CV regression models (362A, 362B, 362C), the averages of each of the set of weights in the local CV regression models (360A, 360B) are taken to generate the federated CV regression model (372) [8]. In this manner, the federated CV regression model (372) takes into account all performance of the three local hardware resource systems (360A, 360B, 360C) without the process of the CV manager (350) obtaining any video stream data.

Turning now to FIG. 3.2, the CV manager (350) distributes the federated CV regression model (372) to each of the local hardware resource systems (360A, 360B, 360C) [9]. In this manner, each of the local hardware resource systems (360A, 360B, 360C) is equipped to perform a recommendation for a number of cameras.

The client environment (300) utilize the resources of local hardware resource system C (360C) to perform a CV inferencing that includes facial recognition processing. Users of the client environment (300) would like to determine a recommended number of video cameras to be used to perform the facial recognition processing. The client environment (300) applies a predetermined configuration of the processing system in the local hardware resource system (360C) to the federated CV regression model (372) to obtain an output that includes a recommendation of the number of cameras [9]. In this example, the predetermined configuration includes a configuration for the number of GPUs of the processing system, a type of GPUs, and the use case of the CV inferencing (i.e., the facial recognition processing). The client environment (300) assigns the recommended number of cameras to the CV inferencing.

End of Example 1

Example 2

Consider a scenario in which an administrator of a client environment would like to utilize the services of a local hardware resource system for predicting heaviness of future traffic based on historical traffic behavior in highways of a major city.

Turning to FIG. 3.3, FIG. 3.3 shows a diagram of a second example system. The second example system includes video cameras (330). Each video camera (332, 334) records traffic of a location on a major highway. The traffic is captured to obtain video data. The video data is compressed using a VMS gateway application (336) on the video cameras (330, 332) to generate encoded video stream data [1]. The encoded video stream data is transmitted to an enhanced networking interface (316) [2]. A field-programmable gate array (324) in the enhanced networking interface (316) performs the method of FIG. 2.2 to obtain the encoded video stream data and performs a decoding (e.g., a decompression) on the obtained data to obtain decoded data. The decoded data is transmitted to a CV inferencing system (312) [3]. The CV inferencing system (312) utilizes GPUs (322) to perform the traffic prediction. The results of the traffic prediction are referred to as inferencing data. The inferencing data is transmitted to an operating system of the local hardware resource manager (310) [4]. The operating system executes on a CPU (306). The CPU may use CPU cache (304) to store at least a portion of the inferencing data.

End of Example 2

Example 3

Consider a scenario in which an administrator of a client environment would like to utilize the services of a local hardware resource system for generating a three-dimensional map of a room with a set of objects. Video cameras may be set up around the room that record the objects over time.

Turning to FIG. 3.4, FIG. 3.4 shows a diagram of a third example system. The third example system includes video cameras (340). Each video camera (342, 344) records a portion of the room and generates video data of the room. The video data is compressed using a VMS gateway application (346) on the video cameras (330, 332) to generate encoded video stream data [1]. The encoded video stream data is transmitted to an enhanced networking interface (316) [2]. A data processing unit (DPU) (326) in the enhanced networking interface (316) performs the method of FIG. 2.3 to obtain the encoded video stream data and performs a decoding (e.g., a decompression) on the obtained data to obtain decoded data. Further, the DPU (326) generates metadata that specifies a location of each video camera (342, 344) and timestamps of the obtained video stream. The decoded data and the generated metadata is stored in GPU direct storage (318) via a first RDMA channel [3]. The decoded data and the metadata is obtained by a CV inferencing system (312) via a second RDMA channel [4]. The CV inferencing system (312) utilizes GPUs (322) to perform the three-dimensional maps. The three-dimensional maps are referred to as inferencing data. The inferencing data is transmitted to an operating system of the local hardware resource manager (310) [5]. The operating system executes on a CPU (306). The CPU may use CPU cache (304) to store at least a portion of the inferencing data End of Example 3

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may improve the efficiency of computing resources by determining configurations of one or more local hardware resource systems used by clients for computer vision inferencing. Embodiments disclosed herein enable the generation of a federated CV regression model that is based on the information such as performance metrics, configurations, and data generated by the local hardware resource systems. Such generation is performed without providing the information to a CV manager. By prompting the local hardware resource systems to perform training, it becomes unnecessary for the CV manager to obtain any sensitive information such as video stream data generated by the local hardware resource systems.

Embodiments disclosed herein enable the servicing of CV inferencing without requiring communication with a central processing unit of the local hardware resource systems. Embodiments disclosed herein enable processing systems to perform the CV inferencing without involvement by the operating system. Further, embodiments disclosed herein utilize an enhanced networking interface to perform initial processing of obtained data before the CV inferencing is performed by the processing systems. The initial processing may include encoding the data, decoding the data, and/or generating metadata of the data.

The enhanced networking interfaces in a system may utilize RDMA-capable components to perform the initial processing and transmit any generated data to processing system storage. In this manner, it reduces the requirement to perform any communications protocols between computing devices, thus improving the overall operations of the system.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system, comprising:
    a processor;
    a processing system operatively connected to the processor;
    an enhanced networking interface operatively connected to the processing system,
    wherein the enhanced networking interface is programmed to:
        obtain encoded data from a local data source;
        perform a decoding of the encoded data to obtain decoded data;
        provide the decoded data to the processing system,
    wherein the processing system is programmed to:
        obtain the decoded data from the enhanced networking interface;
        perform a computer vision (CV) inferencing on the decoded data to obtain inferencing data;
        provide the inferencing data to the processor; and
        perform, by the processor, a remediation action based on the inferencing data.

2. The system of claim 1, wherein the processing system comprises a graphics processing unit (GPU).

3. The system of claim 1, wherein the encoded data is video stream data.

4. The system of claim 3, wherein the video stream data is generated by a video camera, and wherein the encoded data is encoded using a video management system (VMS) application on the local data source.

5. The system of claim 1, wherein performing the decoding comprises formatting the encoded data from a first format to a second format readable by the processing system.

6. The system of claim 1, wherein the enhanced networking interface obtains the encoded data via remote direct memory access (RDMA), and wherein the processing system accesses the processing system storage via the RDMA.

7. The system of claim 1, wherein the enhanced networking interface comprises: a network interface card, a field programmable gate array (FPGA), and a data processing unit.

8. A method for managing hardware resources, comprising:
    obtaining, by an enhanced networking interface, encoded data from a local data source;
    performing a decoding of the encoded data to obtain decoded data;
    performing, by a processing system operatively connected to the enhanced networking interface, a computer vision (CV) inferencing on the decoded data to obtain inferencing data; and
    providing the inferencing data to a processor, and
    performing, by the processor, a remediation action based on the inferencing data.

9. The method of claim 8, wherein the processing system comprises a graphics processing unit (GPU).

10. The method of claim 8, wherein the encoded data is video stream data.

11. The method of claim 10, wherein the video stream data is generated by a video camera, and wherein the encoded data is encoded using a video management system (VMS) application on the local data source.

12. The method of claim 8, wherein performing the decoding comprises formatting the encoded data from a first format to a second format readable by the processing system.

13. The method of claim 8, wherein the enhanced networking interface obtains the encoded data via remote direct memory access (RDMA), and wherein the processing system accesses the processing system storage via the RDMA.

14. The method of claim 8, wherein the enhanced networking interface comprises: a network interface card, a field programmable gate array (FPGA), and a data processing unit.

15. A non-transitory computer readable medium comprising computer readable program code, which when executed by a computer processor enables the computer processor to perform a method for managing hardware resources, the method comprising:
    obtaining, by an enhanced networking interface, encoded data from a local data source;
    performing a decoding of the encoded data to obtain decoded data;

performing, by a processing system operatively connected to the enhanced networking interface, a computer vision (CV) inferencing on the decoded data to obtain inferencing data; and providing the inferencing data to a processor, and performing, by the processor, a remediation action based on the inferencing data.

16. The non-transitory computer readable medium of claim 15, wherein the processing system comprises a graphics processing unit (GPU).

17. The non-transitory computer readable medium of claim 15, wherein the encoded data is video stream data.

18. The non-transitory computer readable medium of claim 15, wherein the video stream data is generated by a video camera, and wherein the encoded data is encoded using a video management system (VMS) application on the local data source.

19. The non-transitory computer readable medium of claim 15, wherein performing the decoding comprises formatting the encoded data from a first format to a second format readable by the processing system.

20. The non-transitory computer readable medium of claim 15, wherein the enhanced networking interface obtains the encoded data via remote direct memory access (RDMA), and wherein the processing system accesses the processing system storage via the RDMA.

* * * * *